C. G. PFEIFFER.
SCREENING CHUTE FOR COAL POCKETS.
APPLICATION FILED JULY 29, 1913.
1,125,709.
Patented Jan. 19, 1915.
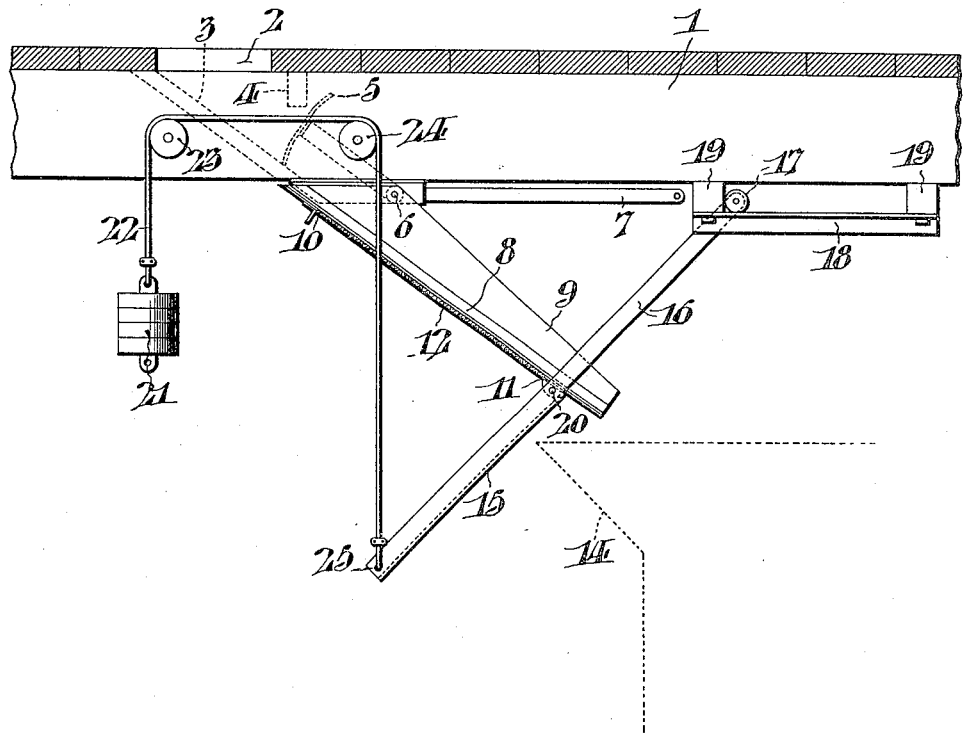
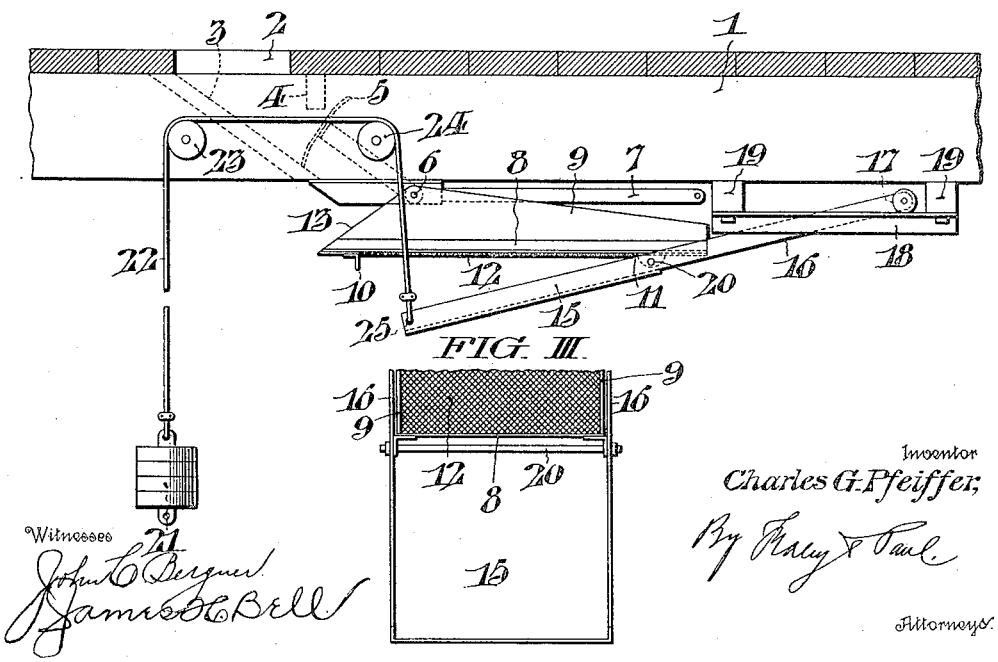

UNITED STATES PATENT OFFICE.

CHARLES G. PFEIFFER, OF PHILADELPHIA, PENNSYLVANIA, ASSIGNOR OF ONE-HALF TO GEORGE W. PARKER, JR., OF PHILADELPHIA, PENNSYLVANIA.

SCREENING-CHUTE FOR COAL-POCKETS.

1,125,709. Specification of Letters Patent. Patented Jan. 19, 1915.

Application filed July 29, 1913. Serial No. 781,709.

*To all whom it may concern:*

Be it known that I, CHARLES G. PFEIFFER, of the city of Philadelphia, county of Philadelphia, and State of Pennsylvania, have invented certain new and useful Improvements in Screening-Chutes for Coal-Pockets, whereof the following is a specification, reference being had to the accompanying drawings.

The invention relates more particularly to screening chutes for coal pockets, with which is combined a dust pan, which is so related to the chute as to direct the screenings away from the wagon into which the chute is discharged.

An object of the invention is to provide a screening chute of the above character with a dust pan, which dust pan and screening chute may be readily raised to inoperative position to permit the free passage underneath the pocket of the wagon into which the coal is to be discharged from the chute.

A further object of the invention is to provide means for counterbalancing the screening chute and dust pan, so that they may be readily raised to inoperative position.

These and other objects will be in part obvious, and will be in part hereinafter more fully disclosed.

In the drawings which show by way of illustration one embodiment of the invention, Figure I, is a sectional view through a coal pocket, showing my improved screening chute and dust pan in side elevation, and in operative position. Fig. II, is a similar view showing parts raised to inoperative position. Fig. III, is a detail in section of a small scale showing the manner of attaching the dust pan to the chute, and the supporting arms therefor.

In the drawings I have shown the lower floor 1, of an ordinary coal pocket or receptacle, which is provided with an opening 2, through which the coal may be discharged. Directly beneath the opening 2, is an inclined floor indicated in dotted lines at 3, in Figs. I and II. A stop 4, coöperates with the incline floor 3, and forms a discharge opening which is controlled by a pivoted gate 5, mounted to swing about a pivot point 6, and operated by a projecting arm 7. These parts are of the usual construction, and will not need further description.

Directly beneath the discharge opening is a pivoted screening chute 8. This screening chute is formed with side walls 9, which are preferably imperforate and said chute has an opening extending from the point 10 to the point 11, which opening is closed by the usual wire mesh screen 12. This wire mesh screen 12, is secured in the usual way to the chute. Said chute is pivoted to turn about the pivot point 6, and may be supported at its pivot point in any usual way. The upper end 13, of the chute is cut at an angle to the longitudinal axis of the chute, and when said chute is in normal operative position, this inclined end rests against the lower face of the discharge chute of the pocket, so that the coal passing from the discharge chute will enter said screening chute. When in this position the screening chute is at an angle to the floor 1. The coal passing therethrough will be delivered into the wagon 14, indicated in dotted lines in Fig. I.

Attached to the lower end of the screening chute is a dust pan 15. This dust pan is U shaped in cross section, and the side walls are extended to form arms 16, 16, which are adapted to rest upon supporting tracks 18, respectively. Each track 18, is carried by the frame structure of the coal pocket, and the movement of the rollers on the tracks is limited by the supports 19, at one end of the track. The arms are pivoted at 20, to the lower end of the screening chute.

The supports 19, for the tracks 18, are so related to the pivotal point of the screening chute that when said screening chute is in operative position, as shown in Fig. I in the drawings, the rollers 17, engage the supports, and the arms 16, serve as a means for supporting and holding the screening chute. These arms also serve to hold the dust pan in proper relation to the screening chute so that the screenings of the coal passing through the screen will strike on the dust pan and be discharged at one side of the wagon into which the screening chute is discharging. The weight of the screenings on the dust pan will tend to turn the pan about the pivotal point 20, where it is connected with the screening chute, and the rollers 17, resting against the supports 19, will prevent any movement of the dust pan about its supporting pivot. From the above construction it will be apparent that the supporting arms 16, serve to hold the screening chute in operative position, and also to hold the dust pan in proper relation to the screening chute. In order to facilitate the raising of the dust pan and the screening chute, I have provided a counterbalance 21, which is carried by a flexible support 22, passing over supporting pulleys 23, and 24, and connected to the lower end of the dust pan 15, at 25. This counterbalance is so proportioned as to facilitate the raising of the screening chute and dust pan, but permits said screening chute to remain in operative position. When it is desired to raise the screening chute, a slight forward pressure on the end of same will cause said screening chute to swing about its pivotal support, and at the same time the rollers 17, moving outward on the tracks 18, will cause the dust pan to be brought up underneath the screening chute in the manner clearly shown in Fig. II of the drawing. This brings the screening chute and dust pan up close underneath the coal pocket, and permits a free passage, so that a wagon or other device may be readily moved underneath the screening pocket into position for receiving the coal. After being properly positioned the screening chute may be readily brought to operative position. The counterbalance as above noted is so proportioned as to retain the screening chute either in operative or inoperative position.

It is obvious that minor changes in the details of construction may be made without departing from the spirit of the invention as set forth in the appended claims.

Having thus described my invention, I claim:

1. The combination of a receptacle having a discharge opening therein, a screening chute pivoted to said receptacle and adapted to be turned about its pivot to inoperative position, a dust pan pivoted to said chute adjacent its lower end and extending in an angle thereto underneath said screening chute, and means for supporting said chute in operative position and for holding the dust pan at an angle thereto, said means including devices whereby said chute and dust pan may be swung about their pivotal supports for raising the dust pan and screening chute to inoperative position.

2. The combination of a receptacle having a discharge opening therein, a screening chute pivoted to said receptacle and adapted to be turned about its pivot to inoperative position, a dust pan pivoted to said chute adjacent its lower end and extending at an angle thereto, and supporting arms for holding said dust pan at an angle to said chute and for sustaining said chute in operative position.

3. The combination of a receptacle having a discharge opening therein, a screening chute pivoted to said receptacle and adapted to be turned about its pivot to inoperative position, a dust pan pivoted to said chute adjacent its lower end and extending at an angle thereto, and supporting arms for holding said dust pan at an angle to said chute and for sustaining said chute in operative position, a counterbalance and means for attaching said counterbalance to the lower end of said dust pan, whereby the weight of the dust pan and screening chute may be counterbalanced.

4. The combination of a receptacle having a discharge opening therein, a screening chute pivoted to said receptacle and adapted to receive the discharge therefrom, a dust pan pivoted to said screening chute at a point adjacent its lower end, and extending at an angle thereto, arms rigidly secured to said dust pan and projecting above said screening chute, rollers carried by the upper ends of said arms, tracks on which said rollers rest, stops for limiting the movement of said rollers for holding said screening chute and dust pan in operative relation to each other, and the receptacle.

5. The combination of a receptacle having a discharge opening therein, a screening chute pivoted to said receptacle and adapted to receive the discharge therefrom, a dust pan pivoted to said screening chute at a point adjacent its lower end, and extending at an angle thereto, arms rigidly secured to said dust pan and projecting above said screening chute, rollers carried by the upper ends of said arms, tracks on which said rollers rest, stops for limiting the movement of said rollers for holding said screening chute and dust pan in operative relation to each other and the receptacle, means for counterbalancing the weight of said dust pan and screening chute, whereby the same may be readily moved to inoperative position.

In testimony whereof, I have hereunto signed my name, at Philadelphia, Pennsylvania, this twenty-eighth day of July 1913.

CHARLES G. PFEIFFER.

Witnesses:
JAMES H. BELL,
E. L. FULLERTON.